United States Patent
Hatke et al.

(10) Patent No.: US 6,596,810 B1
(45) Date of Patent: Jul. 22, 2003

(54) BLENDS OF CYCLOOLEFIN AND CORE/SHELL POLYMERS

(75) Inventors: Wilfried Hatke, Hofheim (DE); Frank Osan, Kelkheim (DE); Otto Herrmann-Schönherr, Bensheim (DE); Vincent Joseph Sullivan, Madison, NJ (US); Thomas Weller, Mainz (DE)

(73) Assignees: Mitsu Petrochemical Ind., Ltd. (JP); Ticona GmbH (DE)

( * ) Notice: Subject to any disclaimer, the term of this patent is extended or adjusted under 35 U.S.C. 154(b) by 0 days.

(21) Appl. No.: 08/967,367

(22) Filed: Nov. 10, 1997

Related U.S. Application Data

(63) Continuation of application No. 08/319,299, filed on Oct. 6, 1994, now abandoned.

(30) Foreign Application Priority Data

Oct. 6, 1993 (DE) .......................................... 43 33 998

(51) Int. Cl.$^7$ .................... C08G 63/48; C08G 63/91; C08L 51/08; C08L 51/00
(52) U.S. Cl. .............. 525/63; 525/64; 525/75; 525/210; 525/211; 525/902
(58) Field of Search .............................. 525/63, 64, 75, 525/210, 211, 902

(56) References Cited

U.S. PATENT DOCUMENTS

| | | | |
|---|---|---|---|
| 4,104,325 A | 8/1978 | Ueshima et al. | 525/75 |
| 5,274,032 A | 12/1993 | Eichenauer et al. | 525/64 |

FOREIGN PATENT DOCUMENTS

| | | |
|---|---|---|
| DE | 27 31 445 | 2/1978 |
| DE | 42 02 108 | 7/1993 |
| EP | 0 485 631 | 5/1992 |

*Primary Examiner*—Patrick D. Niland
(74) *Attorney, Agent, or Firm*—Connolly Bove Lodge & Hutz LLP

(57) ABSTRACT

Polymer alloy comprising a) one or more cycloolefin copolymers and b) one or more types of core/shell particles.

6 Claims, No Drawings

BLENDS OF CYCLOOLEFIN AND CORE/SHELL POLYMERS

This is a continuation of application Ser. No. 08/319,299 filed Oct. 6, 1994, now abandoned.

The present invention relates to polymer alloys of cycloolefin copolymers (COC) and core/shell particles. The polymer alloys (mixtures) according to the invention are impact-resistant and are distinguished by a high flexural strength, elongation at break and improved processibility.

Impact-resistant polymers are sufficiently known and are suitable for a large number of applications (C. B. Bucknall, Toughened Plastics, Applied Science Publishers, London 1977; A. E. Platt, Rubber Modification of Plastics, Advances in Polymer Science, page 437).

It is furthermore known that the impact strength and the elongation at break of polymers can be improved by alloying. Thus, the impact strength of brittle polymers can be improved by alloying with polymer systems which are built up completely or partly or rubbers having low glass transition temperatures. However, this has the disadvantage that the morphology and therefore also the mechanical properties depend sensitively on the processing conditions (Polymer News, Vol. 16 (1991), page 198–206; A. E. Platt, Rubber Modification of Plastics, Advances in Polymer Science, page 437; P. A. Lovell et al., Polymer, 34 (1993) page 61).

In order to avoid this disadvantage, core/shell particles have been proposed for impact modification (Res. Discl. 323, pages 925–926; P. A. Lovell et al., Polymer 34 (1993) page 61; M. Lu et al., Polymer, 34 (1993) page 1874; C. B. Bucknall, Rubber-modified Plastics, Comprehensive Polymer Science, Pergamon Press (1989), page 27–49). These are used as impact modifiers, for example for PVC or PMMA (Gächter/Müller Kunststoff-Additive [Plastics Additives] XXIX; Carl Hanser, Munich, 1983 and C. B. Bucknall, Rubber-modified Plastics, Comprehensive Polymer Science, Pergamon Press (1989), page 27–49). However, since the mechanical properties of impact-modified polymers cannot be predicted additively from the properties of the individual components (D. R. Paul et al. in Encyclopedia of Polymer Science, Volume 12, 1984), impact modification of polymers is a largely empirical task. This means that core/shell particles have to be specifically tailor-made in expensive optimization tests for each polymer of which the impact strength is to be modified and for each application (J. Oshiima, Seni Gakkaishi, 48(5) (1992) page 274; M. Lu et al., Polymer, 34 (1993) page 1874). Commercially obtainable core/shell particles accordingly are in each case suitable only for quite specific polymers and applications.

An essentially prerequisite for achieving adequate impact strengths is good phase adhesion or miscibility between the matrix polymer and the rubber-containing polymer (D. R. Paul in Encyclopedia of Polymer Science Volume 12 (1984) page 437; A. E. Platt in Comprehensive Polymer Science, Pergamon Press N.Y. (1989) page 437, C. B. Bucknall in Toughened Plastics, Applied Science Publishers, London (1977) pages 209–210; M. Lu et al., Polymer, 34 (1993) page 1874). Like all polyolefins, COC (EP 203 799, EP 283 164, EP 407 870, EP 485 893, EP 503 422, DD 222 317, DD 231 070, DD 246 903, EP 156 464) are also poorly miscible with other polymers and therefore have a poor phase adhesion to other polymers. According to D. W. van Krevelen (Properties of Polymers, Elsevier, Amsterdam-Oxford-New York, 1976, chapter 4), the compatibility and therefore the phase adhesion can be estimated via the solubility parameter delta, values of about 13.5 $J^{1/2}cm^{3/2}$ being obtained. These values are significantly below those of typical impact-modifiable polymers.

For impact modification of COC, it has thus hitherto been necessary to crosslink these with the rubber-containing polymer (JP 92-170453, JP 92-170454, JP 356353).

The morphologies and degrees of crosslinking and the associated impact strength and rheological properties can be established reliably and reproducibly by this procedure only with difficulty. In particular, the reproducibility of the properties mentioned depends sensitively on parameters such as, for example, processing conditions, crosslinking agent content, temperature and time.

The object was thus to provide an impact-resistant polymer which avoids the disadvantages of the prior art.

Surprisingly, it has now been found that polymer alloys of COC and core/shell particles are impact-resistant and have a good flexural strength. Furthermore, COC can be impactmodified with a large number of widely diverse core/shell particles without the particles having to be optimized in an expensive manner for the polymer and the particular application. Furthermore, the polymer alloys can be processed in an industrially simple manner.

The present invention thus relates to a polymer alloy which comprises a) one or more cycloolefin copolymers and b) one or more types of core/shell particles.

The polymer alloy according to the invention preferably comprises one COC and one or more types of core/shell particles, particularly preferably one COC and one type of core/shell particles.

The COC which are suitable for the purposes of the invention have glass transition temperatures of between 50 and 250° C., preferably between 100 and 200° C., particularly preferably between 100 and 150° C.

The polymer alloy (mixtures) according to the invention preferably comprises COC which comprise 0.1 to 99% by weight of structural units which are derived from polycyclic olefins, based on the total weight of the COC, preferably radical such as a linear or branched $C_1$–$C_8$-alkyl radical, a $C_6$–$C_{18}$-aryl radical, a $C_7$–$C_{20}$-alkylenearyl radical or a cyclic or acyclic $C_2$–$C_{10}$-alkenyl radical, or two or more radicals $R^1$ to $R^8$ form a ring, and the radicals $R^1$ to $R^8$ in the various formulae I to VI can have a different meaning, 0 to 95% by weight of structural units, based on the total weight of the COC, which are derived from one or more monocyclic olefins, preferably of the formula VII

(VII)

in which n is a number from 2 to 10, and 0 to 99% by weight of structural units, based on the total weight of the COC, which are derived from one or more acyclic olefins, preferably of the formula VIII

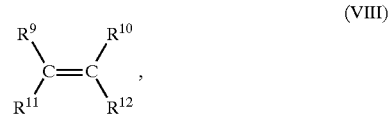

(VIII)

in which $R^9$, $R^{10}$, $R^{11}$ and $R^{12}$ are identical or different and are a hydrogen atom or a $C_1$–$C_{20}$ hydrocarbon radical such as $C_1$–$C_8$-alkyl radical or $C_6$–$C_{12}$-aryl radical.

The cycloolefin copolymers preferably comprise structural units which are derived from one or more cyclic olefins, particularly preferably polycyclic olefins of the formulae I or III, and one or more acyclic olefins preferably of the formula VIII, in particular α-olefins having 2 to 20 carbon atoms. Cycloolefin copolymers which comprise structural units which are derived from a polycyclic olefin of the formula I or III and an acyclic olefin of the formula VIII are particularly preferred.

Preferred COC are those which comprise structural units of the formulae I, II, III, IV, V or VI,

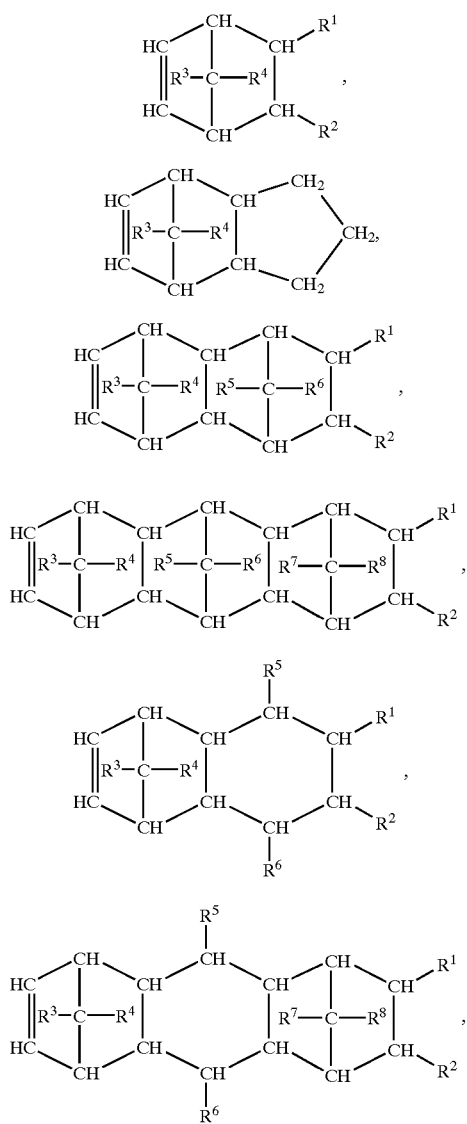

in which $R^1$, $R^2$, $R^3$, $R^4$, $R^5$, $R^6$, $R^7$ and $R^8$ are identical or different and are a hydrogen atom or a $C_1$–$C_{20}$ hydrocarbon which are derived from polycyclic olefins having a norbornene base structure, particularly preferably norbornene or tetracyclododecene. Preferred COC are also those which comprise structural units which are derived from acyclic olefins having terminal double bonds, such as α-olefins, particularly preferably ethylene or propylene. Norbornene/ ethylene and tetracyclododecene/ethylene copolymers are particularly preferred. The content of acyclic olefins preferably of the formula VIII is 0 to 99% by weight, preferably 5 to 80% by weight, particularly preferably 10 to 60% by weight, based on the total weight of the COC.

The COC are prepared at temperatures of −78 to 150° C. Under a pressure of 0.01 to 64 bar, in the presence of one or more catalysts, which comprise a transition metal compound and, if appropriate, a cocatalyst. Suitable transition metal compounds are metallocenes, especially stereorigid metallocenes, and compounds based on titanium and vanadium. Examples of catalyst systems appropriate to the preparation of the COC suitable for the purposes of the invention are described, for example, in EP 203 799, EP 283 164, EP 407 870, EP 485 893, EP 503 422, DD 222 317, DD 231 070.

Examples of transition metal compounds employed are:
rac-dimethylsilyl-bis-(1-indenyl)-zirconium dichloride,
rac-dimethylgermyl-bis-(1-indenyl)-zirconium dichloride,
rac-phenylmethylsilyl-bis-(1-indenyl)-zirconium dichloride,
rac-phenylvinylsilyl-bis-(1-indenyl)-zirconium dichloride,
1-silacyclobutyl-bis-(1-indenyl)-zirconium dichloride,
rac-diphenylsilyl-bis-(1-indenyl)-hafnium dichloride,
rac-phenylmethylsilyl-bis-(1-indenyl)-hafnium dichloride,
rac-diphenylsilyl-bis-(1-indenyl)-zirconium dichloride,
rac-ethylene-1,2-bis-(1-indenyl)-zirconium dichloride,
dimethylsilyl-(9-fluorenyl)-(cyclopentadienyl)-zirconium dichloride,
diphenylsilyl-(9-fluorenyl)-(cyclopentadienyl)-zirconium dichloride,
bis-(1-indenyl)-zirconium dichloride,
diphenylmethylene-(9-fluorenyl)-cyclopentadienyl zirconium dichloride,
isopropylene-(9-fluorenyl)-cyclopentadienyl-zirconium dichloride,
phenylmethylmethylene-(9-fluorenyl)-cyclopentadienyl-zirconium dichloride,
isopropylene-(9-fluorenyl)-(1-(3-isopropyl) cyclopentadienyl)-zirconium dichloride,
isopropylene-(9-fluorenyl) (1-(3-methyl)cyclopentadienyl)-zirconium dichloride,
diphenylmethylene-(9-fluorenyl) (1-(3-methyl) cyclopentadienyl)-zirconium dichloride,
methylphenylmethylene-(9-fluorenyl) (1-(3-methyl) cyclopentadienyl)-zirconium dichloride,
dimethylsilyl-(9-fluorenyl) (1-(3-methyl)cyclopentadienyl)-zirconium dichloride,
diphenylsilyl-(9-fluorenyl) (1-(3-methyl)cyclopentadienyl)-zirconium dichloride,
diphenylmethylene-(9-fluorenyl) (1-(3-tert-butyl) cyclopentadienyl)-zirconium dichloride,
isopropylene-(9-fluorenyl) (1-(3-tert-butyl) cyclopentadienyl)-zirconium dichloride,
isopropylene-(cyclopentadienyl)-(1-indenyl)-zirconium dichloride,
diphenylcarbonyl-(cyclopentadienyl)-(1-indenyl)-zirconium dichloride,
dimethylsilyl-(cyclopentadienyl)-(1-indenyl)-zirconium dichloride,
isopropylene-(methylcyclopentadienyl)-(1-indenyl)-zirconium dichloride and analogous hafnocenes, titanium tetrachloride, $VOCl_3$, $VOCl_2(OCH_3)$, $VOCl_2(OC_2H_5)$ and $VOCl(OC_2H_5)_2$.

Preferred compounds here are:
rac-dimethylsilyl-bis-(1-indenyl)-zirconium dichloride,
rac-phenylmethylsilyl-bis-(1-indenyl)-zirconium dichloride,
rac-phenylvinylsilyl-bis-(1-indenyl)-zirconium dichloride,
rac-diphenylsilyl-bis-(1-indenyl)-zirconium dichloride,
rac-ethylene-1,2-bis-(1-indenyl)-zirconium dichloride,
isopropylene-(cyclopentadienyl)-(1-indenyl)-zirconium dichloride,
diphenylcarbonyl-(cyclopentadienyl)-(1-indenyl)-zirconium dichloride, dimethylsilyl-(cyclopentadienyl)-(1-indenyl)-zirconium dichloride,
isopropylene-(methylcyclopentadienyl)-(1-indenyl)-zirconium dichloride.

The COC suitable for the purposes of the invention have glass transition temperatures of between 50 and 250° C., preferably between 100 and 200° C., particularly preferably between 100 and 150° C.

The COC suitable for the purposes of the invention have viscosity numbers (determined in Decalin at 135° C.) of between 25 and 200 ml/g, preferably between 40 and 120 ml/g, particularly preferably between 40 and 80 ml/g.

The core/shell particles contained in the polymer alloy according to the invention comprise two (core and one shell) or more (core and a plurality of shells) layers of different polymers alternating with one another. A common feature of these particles is that the individual layers comprise polymers having different glass transition temperatures Tg. Polymers with a low glass transition temperature are called the rubber phase here, and polymers having a high glass transition temperature here are called the hard phase. Such particles can be prepared, for example, by emulsion polymerization. One or more layers can be crosslinked chemically during preparation, so that the shape and size of the core/shell particle does not change during subsequent alloying with COC.

Suitable non-crosslinked base materials for the crosslinked rubber phases are polymer systems which have glass transition temperatures below 0° C., preferably below –20° C. and particularly preferably below –40° C. All polymers which have such glass transition temperatures and are suitable for synthesis of core/shell particles are in principle suitable.

Core/shell particles, the rubber phases of which have particularly low glass transition temperature Tg, are particularly suitable for the preparation of polymer alloys which are employed for applications at low temperatures.

The glass transition temperatures of the rubber phases often cannot be measured per se, but can be determined by preparing an emulsion polymer of the monomer composition in question, isolating this polymer and determining its glass transition temperature. Another method for determination of the glass transition temperatures of the rubber phases comprises measurement of dynamic mechanical properties of the polymer alloys according to the invention and of those of the matrix polymers by themselves. Maxima in the loss factor curves can be regarded as a measure of the glass transition temperatures.

The core/shell particles which are suitable for the purposes of the invention comprise rubber phases in % by volume, based on the total volume of the particles, of between 10 and 90, preferably between 20 and 70 and particularly preferably between 30 and 60.

The core/shell particles which are suitable for the purposes of the invention comprise hard phases in % by volume, based on the total volume of the particles, of between 90 and 10, preferably between 80 and 30 and particularly preferably between 70 and 40.

The preparation of core/shell particles is well-known and is described in detail, for example, in U.S. Pat. No. 3,833,682, U.S. Pat. No. 3,787,522, DE 2 116 653, DE 22 53 689, DE 41 32 497, DE 41 31 738, DE 40 40 986, U.S. Pat. No. 3,251,904, DE 33 00 526.

Homo- or copolymers comprising two or more monomer types can be used as the rubber phase of the core/shell particles. A common feature of these homo- and copolymers is a glass transition temperature below 0° C.

The homo- and copolymers here can be derived from the following monomers:
conjugated diene monomers, such as butadiene, isoprene and chloroprene, and monoethylenically unsaturated monomers, such as alkyl and aryl acrylates, in which the alkyl radicals can be linear, cyclic or branched and the aryl radicals in turn can themselves be substituted,
alkyl and aryl methacrylates, in which the alkyl radicals can be linear, cyclic or branched and the aryl radicals in turn can themselves be substituted,
substituted alkyl and aryl methacrylates and acrylates, in which the substituents can be linear, cyclic or branched alkyl radicals or substituted aryl radicals,
acrylonitriles and substituted acrylonitriles (for example methacrylonitrile, alpha-methyleneglutaronitrile, alpha-ethylacrylonitrile, alpha-phenylacrylonitrile), alkyl- and arylacrylamides and substituted alkyl- and arylacrylamides,
vinyl esters and substituted vinyl esters,
vinyl ethers and substituted vinyl ethers,
vinylamides and substituted vinylamides,
vinyl ketones and substituted vinyl ketones,
vinyl halides and substituted vinyl halides,
olefins having one or more unsaturated double bonds, such as are used, for example, for the preparation of olefinic rubbers, in particular ethylene, propylene, butylene and 1,4-hexadiene, and
vinyl-aromatic compounds, such as styrene, alpha-methylstyrene, vinyltoluene, halostyrenes and t-butylstyrene.

Rubber phases based on organopolysiloxanes of the following formula can likewise be used for building up core/shell particles

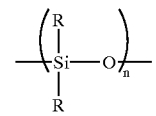

in which R is identical or different alkyl or alkenyl radicals having 1 to 10 carbon atoms, aryl radicals or substituted hydrocarbon radicals. The alkyl radicals and alkenyl radicals here can be linear, branched or cyclic.

Rubber phases based on fluorinated monoethylenically unsaturated compounds such as tetrafluoroethylene, vinylidene fluoride, hexafluoropropene, chlorotrifluoroethylene and perfluoro(alkylvinyl ethers) can also be used.

The rubber phases can also be crosslinked, for which polyfunctional unsaturated compounds such as are described, for example, in DE 2 116 653, U.S. Pat. No. 3,787,522 and EP 0 436 080 can be used. The use of grafted-on monomers is also described in these publications. These compounds are employed in order to bind a possible further shell chemically to the phase underneath, if this is desired.

Core/shell particles in which the rubber phases are based on butadiene are preferred for achieving polymer alloys having a good impact strength even at low temperatures.

Core/shell particles in which the rubber phases are based on acrylic acid esters are preferred for achieving polymer alloys having a good stability to weathering.

Core/shell particles in which the rubber phases are based on organosiloxanes are preferred if the polymer alloys are to combine good impact strength at low temperatures, good stability to weathering and good stability during preparation and processing from the melt with one another.

Homo- and copolymers can be used for the hard phases of the core/shell particles according to the invention. The copolymers here can be built up from two or more monomers. A common feature of the corresponding homo- and copolymers is a glass stage above 50° C. The homo- and copolymers here can be derived from the following monomers.

Monoethylenically unsaturated compounds, such as
alkyl and aryl acrylates, in which the alkyl radicals can be linear, cyclic or branched and the aryl radicals in turn can themselves be substituted,
alkyl and aryl methacrylates, in which the alkyl radicals can be linear, cyclic or branched and the aryl radicals in turn can themselves be substituted,
substituted alkyl and aryl methacrylates and acrylates, in which the substituents can be linear, cyclic or branched alkyl radicals or substituted aryl radicals,
acrylonitriles and substituted acrylonitriles (for example methacrylonitrile, alpha-methyleneglutaronitrile, alpha-ethylacrylonitrile, alpha-phenylacrylonitrile and the like),
alkyl- and arylacrylamides,
vinyl esters and substituted vinyl esters,
vinyl ethers and substituted vinyl ethers,
vinylamides and substituted vinylamides,
vinyl ketones and substituted vinyl ketones,
vinyl halides and substituted vinyl halides,
olefins (for example ethylene, propylene, butylene), cyclic olefins (for example, norbornene, tetracyclododecene, 2-vinylnorbornene),
fluorinated monoethylenically unsaturated compounds such as tetrafluoroethylene, vinylidene fluoride, hexafluoropropene, chlorotrifluoroethylene and perfluoro (alkylvinyl ether), and
vinyl-aromatic compounds of the formula:

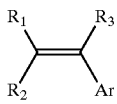

in which $R_1$, $R_2$ and $R_3$ are hydrogen, linear, branched or cyclic alkyl radicals or substituted or unsubstituted aryl radicals, which can be identical or different, and Ar is an aromatic $C_6$–$C_{18}$-radical, which can additionally also carry substituents, such as alkyl radicals or halogen radicals.

The hard phases can be crosslinked, for which polyfunctional unsaturated compounds such as are described, for example, in DE 2 116 653, U.S. Pat. No. 37,787,522 and EP 0 437 080 are suitable. The use of grafted-on monomers is also described in these publications. These compounds are employed in order to bind a possible further shell chemically to the shell underneath, if this is desired.

Possible non-crosslinked base materials for the hard phases are all polymers having glass transition temperatures above 50° C., preferably above 80° C. and particularly preferably above 100° C.

The polymer alloy according to the invention can also comprise commercially obtainable core/shell particles, for example
Staphyloid types from TAKEDA Chem. Industries, such as, for example, those described in JP 17514 or JP 129266,
Kane-Ace types from KANEKA, which are described, for example, in the production brochure Kane ACE-B,
Metablen C, Metablen W and Metablen E types from METABLEN Company BV, which are described in the product brochure Metablen,
Blendex types from GE PLASTICS or
Paraloid types from ROHM and HAAS, which are described, for example, in Gächter/Müller Kunststoff-Additive [Plastics Additives], Carl Hanser Munich (1983) page XXIX et seq. or the brochure PARALOID BTA 733, Impact Modifier for Clear Packaging (1987) from Rohm and Haas or the brochure PARALOID BTA-III N2 BTA-702 BTA 715 (1989) from Rohm and Haas.

The polymer alloys according to the invention comprise 2 to 50% by weight, preferably 10 to 40% by weight and particularly preferably 10 to 25% by weight, of core/shell particles, based on the total alloy.

Core/shell particles having average refractive indices (volume mean) of between 1.52 and 1.55, preferably between 1.53 and 1.54, are suitable for achieving the highest possible transparency of the polymer alloys. The particular choice of optimum particle refractive indices and radii ratios of the particles is determined in accordance with Makromol. Chem. 183 (1990) 221 for particles of one core and one shell, or in accordance with M. Kerker, The Scattering of Light, Academic Press (1969) chapter 5.4 for multishell particles. Core/shell modifiers having a multilayer structure which comprise a core and several shells in particular are especially suitable for obtaining transparent impact-resistant polymer alloys.

The polymer alloys according to the invention are prepared at temperatures above the glass transition temperature of the COC of between 60 and 350° C., preferably between 100 and 150° C. and particularly preferably between 110 and 130° C.

The polymer alloys according to the invention can be prepared by customary processes (D. D. Walsh, Comprehensive Polymer Science, Pergamon Press (1989), chapter 5.2; J. L. White and K. Min, Comprehensive Polymer Science, Pergamon Press, (1989), page 285 et seq.). In particular, the components can be processed in the form of powders or granules, by extrusion together from the melt, to give granules or chips, which can then be converted into shaped structures, for example by pressing, extrusion or injection molding. The polymer alloy according to the invention is particularly suitable for production of injection-molded, injection blow-molded, extrusion blow-molded or extruded shaped articles. Furthermore, films and fibers can also be produced from the polymer alloy according to the invention.

The polymer alloys according to the invention can be prepared, in particular, by so-called master batches. In this process, core/shell particles are mixed in amounts of 20 to 80% by weight, based on the total weight of the polymer alloy, with one or more COC (preferably by extrusion together) and the mixture is then brought to the desired final concentration by renewed mixing (preferably by extrusion together) with one or more COC. This method leads to good dispersion of the core/shell particles and is preferably used if polymer alloys having contents of 3 to 25% by weight of core/shell particles, based on the total weight of the alloy, are prepared.

The polymer alloy according to the invention has elongations at break of 4 to 200%, preferably 5 to 100%, particularly preferably 10 to 30%, and notched impact strengths of 2.5 to 100 kJ/m$^2$, preferably of 4 to 50 kJ/m$^2$, particularly preferably of 10 to 30 kJ/m$^2$.

The polymer alloys can comprise additives in the customary amounts, such as, for example, plasticizing agents, UV stabilizers, optical brighteners, antioxidants, antistatics, heat stabilizers or reinforcing additives, such as glass fibers, carbon fibers or high modulus fibers, such as polyaramide or liquid crystalline polyesters or the like. They can furthermore comprise fillers, such as inorganic materials, talc, titanium dioxide or the like.

The polymer alloy according to the invention is suitable for a large number of applications, such as containers, bottles, drinking cups, medical applications, such as blister packs or injection-molded components for anesthesia, respiration, pediatrics or medical supply equipment, domestic goods, such as cutlery, microwave utensils, freezer containers, bowls, tubs, in particular bathtubs, clothes-pins, toilet seats, water taps, furniture, suitcases, in particular shell-type suitcases, flowerpots, lids and closures for bottles, toys, such as building blocks or pedal cars, extruded film, for example for packaging, capacitor applications, covering tarpaulins, building applications, such as window profiles, panels, folding doors, blinds and flooring, aviation applications, such as aircraft interior fittings, fibers for textiles, housings of electrical equipment, such as printers, display screens, keyboards, computers, telephone, hi-fi equipment, lamp housings, impact drilling machines, belt grinders, vibrating grinders, circular saws, applications at low temperatures, such as refrigerator inserts or freezer cabinet components, cable sheathings, pipes, sports equipment, such as protective helmets, boat hulls and surfboards, interior fittings of automobiles, such as linings or dashboards, exterior fittings on automobiles, such as bumpers, opaque planking or hub caps, semi-finished products, such as seals, pipe connectors or cable connectors.

The polymer alloy according to the invention has a high flexural strength and a high stress cracking resistance as well as a good melt stability. It shows a good weld strength and good flow properties, which is of particular advantage for injection molding applications. The mechanical properties, such as, for example, heat distortion stability, elongation at break and notched impact strength, can be varied within wide ranges, so that many fields of application are accessible. The polymer alloy according to the invention can be prepared without it being necessary to carry out optimization of the core/shell particles for the COC in expensive tests. Furthermore, processing and preparation of the polymer alloy are easy to carry out industrially.

EXAMPLES

The cycloolefin copolymers and core/shell particles were first dried (90° C., 24 hours, reduced pressure) and then extruded together under an inert gas (argon) in various weight ratios in an extruder (Haake, Rheocord System 90/Rheomex TW 100, Karlsruhe, Germany). The polymer alloys, which were obtained in the form of granules, were dried again as described above and then injection-molded under an inert gas (argon) to give tensile specimens, impact specimens and sheets. A KM 90-210 B injection molding machine from Krauss-Maffei, Munich, Germany was used. The physical properties of the cycloolefin copolymers and polymer alloys thereof were characterized as follows.

Glass transition temperatures were determined using a differential scanning calorimeter DSC 7 from Perkin Elmer, Überlingen, Germany. The heating rate was 20° C./minute.

A tensile stress/elongation machine 4302 from Instron, Offenbach, Germany was employed for determination of mechanical properties such as elasticity moduli, elongations at break and tensile strengths according to DIN 53455 (tensile stress/elongation properties).

Notched impact strengths were measured by means of a hammer pendulum 5102, with instruments, from Zwick, Ulm, Germany according to DIN 53453.

Melt viscosities were determined using a rheometer RDS from Rheometrics, Piscataway, N.J., USA.

Viscosity numbers of the COC used were determined according to DIN 53728 (decahydronaphthalene, 135° C.).

3-point bending tests were carried out on injection-molded test specimens according to DIN 53452/53457.

The following commercially obtainable core/shell particles were used:

| | |
|---|---|
| Blendex 338 | GE Plastics |
| Kane Ace B 511 | Kaneka |
| Kane Ace B 56 | Kaneka |

Polymerizations

Example 1

A clean and dry 75 dm$^3$ polymerization reactor with a stirrer was flushed with nitrogen and then with ethylene and filled with 12 kg of norbornene and 15 dm$^3$ of toluene. 300 ml of triisobutylaluminum solution (20% w/w in toluene) were added. The ethylene pressure was adjusted to an increased pressure of 18 bar. The reaction temperature was adjusted to 70° C. 20 mg of isopropenyl (cyclopentadienyl) (1-indenyl)-zirconium dichloride were dissolved in 500 ml of a toluene solution of methylaluminoxane (10% by weight of methylaluminoxane of molecular weight 1300 g/mol according to cryoscopic determination) and the solution was then metered into the reactor. The ethylene pressure was kept at 18 bar by topping up. After a polymerization time of 90 minutes, the contents of the reactor were emptied into a 150 dm$^3$ stirred tank into which 500 g of Celite and 200 ml of water in 50 dm$^3$ of a hydrogenated diesel oil fraction (Exxsol, boiling range 100 to 120° C. from Exxon) had been initially introduced. The mixture was stirred at 60° C. for 20 minutes. A filter cake of 500 g of Celite suspended in 10 dm$^3$ of Exxsol was built up on the filter fabric of a 120 dm$^3$ pressure suction filter. The polymer solution was filtered over the pressure suction filter. A nitrogen pressure of 2.8 bar was built up over the solution. The mixture was then filtered over seven filter candles (Fluid Dynamics, Dynalloy XS 64.5 μm 0.1 m$^2$/candle), which were mounted in a steel housing. The polymer solution was stirred into 500 dm$^3$ of acetone by means of a disperser (Ultraturrax) and thereby precipitated. The suspension was circulated over a 680 dm$^3$ stirred pressure suction filter with the bottom valve open. After the bottom valve had been closed, the residue was washed three times with 200 dm$^3$ of acetone. After the last washing, the product was predried in a stream of nitrogen at 60° C. and dried in a drying cabinet for 24 hours under 0.2 bar and at 80° C. 5.37 kg of polymer were obtained. The viscosity number was 51 ml/g and the glass transition temperature 105° C.

Example 2

The procedure was as in Example 1, but . . .

The properties of the products are shown in Table 1.

TABLE 1

| COC | Catalyst | Glass transition temperature (° C.) | Viscosity number ml/g | Monomers |
|---|---|---|---|---|
| COC 1 | K$_1$ | 135 | 61 | Nb, Et |
| COC 2 | K$_1$ | 134 | 54 | Nb, Et |

K$_1$: Isopropylene (1-indenyl)cyclopentadienylzirconium dichloride
Nb: Norbornene
Et: Ethylene Measurements

Example 3

The following tables show the notched impact strengths of pure COC and COC-core/shell particle alloys:

TABLE 3.1

Notched impact strengths of pure COC (in kJ/m$^2$)
Notched impact strength

| | |
|---|---|
| COC 1 | 1.9 |

TABLE 3.2

Notched impact strengths of COC-core/shell particle alloys (in kJ/m$^2$)

| COC | Core/shell particles | % by weight of core/shell particles | Notched impact strength |
|---|---|---|---|
| COC 1 | M 511 | 20 | 8.5 |
| COC 1 | B 56 | 20 | 8.7 |
| COC 2 | Blendex 338 | 20 | 6.0 |

Example 4

TABLE 4

Bending properties of COC-core/shell particle alloys

| COC | Core/shell particles (20% by wt.) | E Modulus (MPa) | Flexural strength (MPa) | Breaking stress (Mpa) |
|---|---|---|---|---|
| COC 1 | M 511 | 2.15 | 74 | no fracture |

Example 5

The following tables show the tensile stress/elongation properties of pure COC and COC-core/shell particle alloys:

TABLE 5.1

Tensile stress/elongation properties of pure COC

| | Modulus (GPa) | Elongation at break (%) | Tensile strength (MPa) |
|---|---|---|---|
| COC 1 | 3.16 | 2.7 | 64 |
| COC 2 | 3.16 | 2.7 | 60 |

TABLE 5.2

Tensile stress/elongation properties of COC-core/shell particle alloys

| Alloy | | % by wt. of core/shell particles | Modulus (GPa) | Elongation at break (%) | Tensile strength (MPa) |
|---|---|---|---|---|---|
| COC 1 | M 511 | 20 | 2.15 | 36.0 | 39.0 |
| COC 1 | B 56 | 20 | 2.10 | 22.0 | 36.0 |
| COC 2 | Blendex 338 | 20 | 2.16 | 23.0 | 36.5 |

Example 6

The following polymers were mixed in a weight ratio of 50 to 50 in a Haake extruder:

COC2/PMMA, COC5/PMMA, COC9/PMMA, COC2/polystyrene, COC5/polystyrene, COC9/polystyrene, COC2/polycarbonate, COC5/polycarbonate, COC9/polycarbonate. In all cases, the unchanged glass transition temperatures of the two components were found by means of DSC measurements (Perkin Elmer DSC-7, Überkingen, Germany).

What is claimed is:

1. A polymer alloy comprising (a) one or more cycloolefin copolymer "(COC)" component(s), and, dispersed in said cycloolefin copolymer component, (b) one or more particulate core/shell components;

said cycloolefin copolymer component consisting essentially of at least one cycloolefin copolymer comprising structural units obtained by copolymerization of two or more of the following olefins in the indicated amounts:

0.1–99% by weight, based on the weight of the cycloolefin copolymer, of at least one of the following polycyclic olefins of the formulas I, II, III, IV, V or VI,

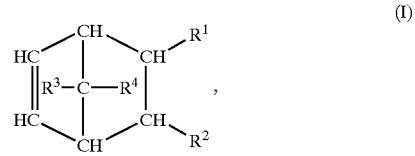

(I)

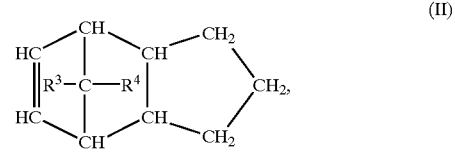

(II)

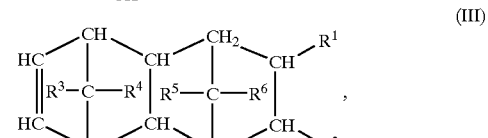

(III)

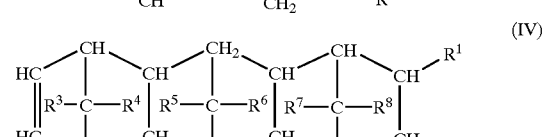

(IV)

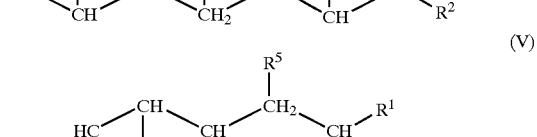

(V)

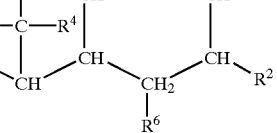

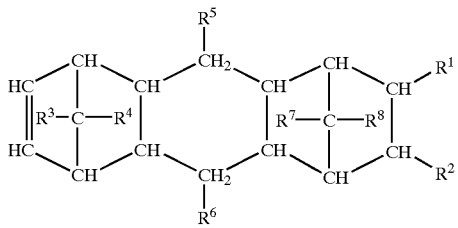 (VI)

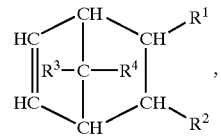 (I)

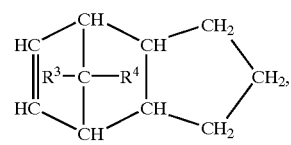 (II)

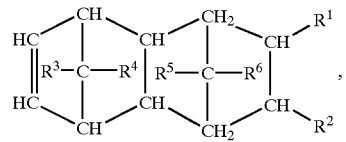 (III)

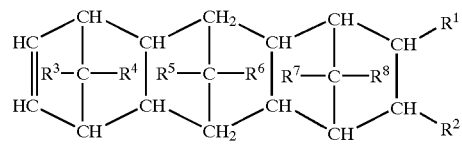 (IV)

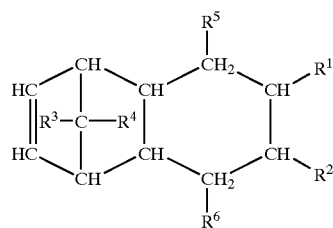 (V)

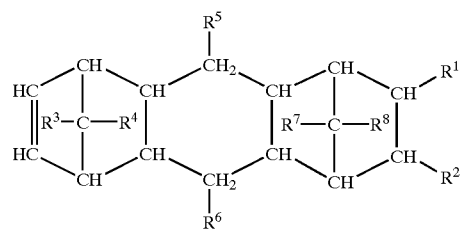 (VI)

in which $R^1$, $R^2$, $R^3$, $R^4$, $R^5$, $R^6$, $R^7$ and $R^8$ are identical or different and are a hydrogen atom or a $C_1$–$C_{20}$ hydrocarbon radical, or two or more of the radicals $R^1$ through $R^8$ form a ring, if sterically positioned to be able to form a ring, and the radicals $R^1$ to $R^8$ in the formulae I to VI are identical or different from one another, 0 to 95% by weight, based on the total weight of the cycloolefin copolymer, of at least one monocyclic olefin of the formula VII

 (VII)

in which n is a number from 2 to 10, and 0 to 99% by weight, based on the total weight of the cycloolefin polymer, of one or more acyclic olefins of the formulae VIII

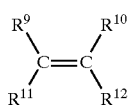 (VIII)

in which $R^9$, $R^{10}$, $R^{11}$ and $R^{12}$ are identical or different and are a hydrogen atom or a $C_1$–$C_{20}$ hydrocarbon radical; and said particular core/shell component consisting essentially of:
one or more rubber phase(s) and one or more hard phase(s), the hard phase having a glass transition temperature above 50° C. and the rubber phase having a lower glass transition temperature than said hard phase, said rubber and hard phases consisting essentially of polymerized unsaturated compounds having carbon—carbon bonds in the polymer backbone and wherein said particulate core/shell component have an average refractive index, determined as the volume mean, of 1.52 to 1.55.

2. A polymer alloy, which comprises a) one cycloolefin copolymer (COC) and b) one core and at least one shell being of different material than said core and having a different Tg than said core to form core/shell particles wherein said COC comprises 0.1 to 99% by weight of structural units, based on the total weight of the cycloolefin copolymer, which are derived from one or more polycyclic olefins of the formulae I, II, III, IV, V or VI, in which $R^1$, $R^2$, $R^3$, $R^4$, $R^5$, $R^6$, $R^7$ and $R^8$ are identical or different and are a hydrogen atom or a $C_1$–$C_{20}$ hydrocarbon radical or two or more of the radicals $R^1$ through $R^8$ form a ring, if sterically positioned to be able to form a ring, and the radicals $R^1$ to $R^8$ in the various formulae I to VI are identical or different from one another, 0 to 95% by weight of structural units, based on the total weight of the cycloolefin copolymer, which are derived from one or more monocyclic olefins of the formula VII

 (VII)

in which n is a number from 2 to 10, and 10 to 60% by weight the structural units based on the total weight of the cycloolefin copolymer is derived from formulae VIII,

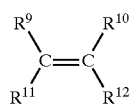

(VIII)

in which $R^9$, $R^{10}$, $R^{11}$ and $R^{12}$ are identical or different and are a hydrogen atom or a $C_1$–$C_{20}$ hydrocarbon radical and said core and shell consists essentially of polymerized unsaturated compounds having carbon-carbons in the polymer backbone and wherein the core/shell particles are in amount from 10 to 40% by weight based on the total alloy and have an average refractive indices of between 1.53 to 1.54.

3. The polymer alloy as claimed in claim 2, wherein the core/shell particles are in amount from 10 to 25% by weight based on the total alloy.

4. The polymer alloy according to claim 3, wherein the polymer alloy has an elongation at break of 4 to 200%, and notched impact strengths of 2.5 to 100 kJ\$M^2$.

5. The polymer alloy according to claim 4, wherein the polymer alloy has an elongation at break of 5 to 100%, and notched impact strengths of 4 to 50 kJ\$M^2$.

6. The polymer alloy according to claim 5, wherein the polymer alloy has an elongations at break of 10 to 30%, and notched impact strengths of 10 to 30 kJ\$M^2$.

* * * * *